A. H. R. KUHN.
NUT LOCK.
APPLICATION FILED FEB. 20, 1915.
1,187,069.
Patented June 13, 1916.
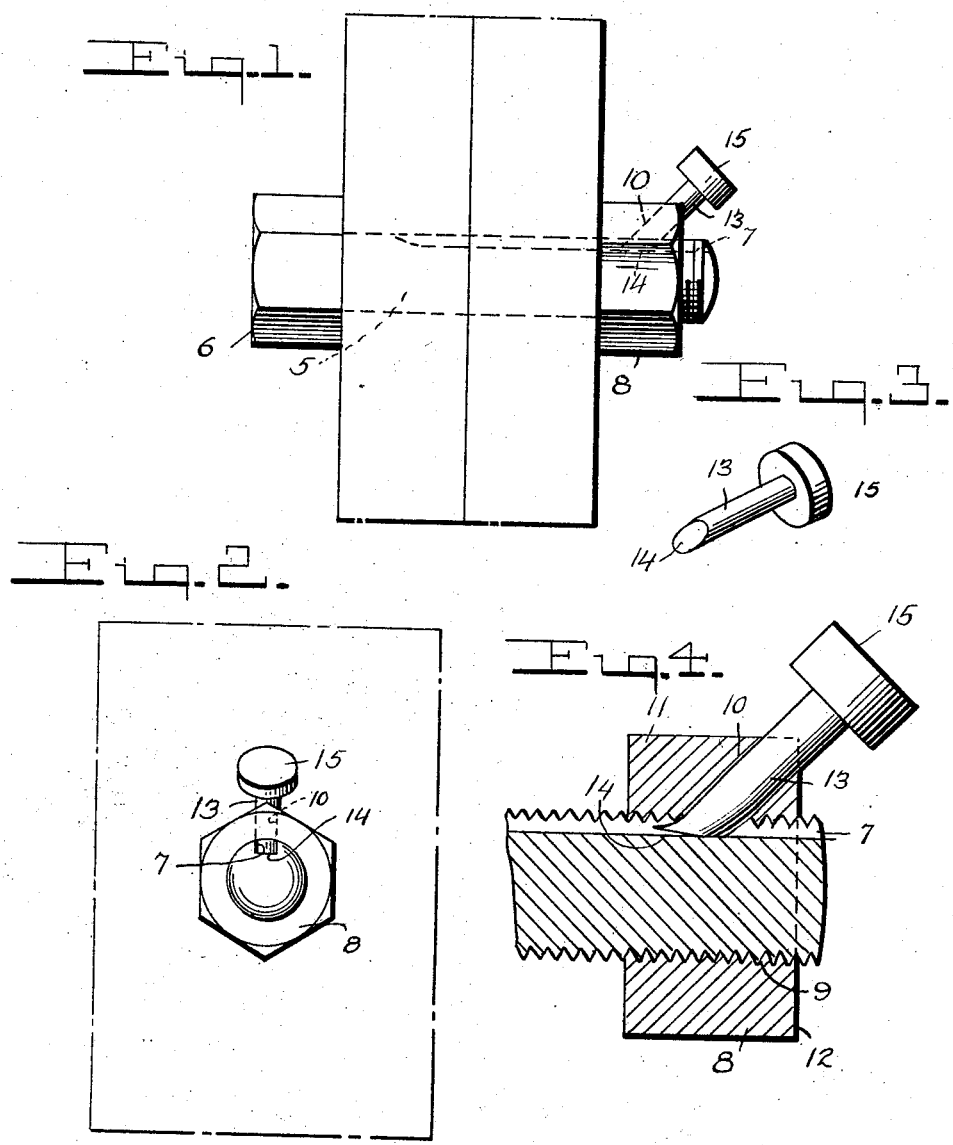

UNITED STATES PATENT OFFICE.

ALBERT H. R. KUHN, OF OLEAN, NEW YORK.

NUT-LOCK.

1,187,069.  Specification of Letters Patent.  Patented June 13, 1916.

Application filed February 20, 1915. Serial No. 9,614.

*To all whom it may concern:*

Be it known that I, ALBERT H. R. KUHN, a citizen of the United States, residing at Olean, in the county of Cattaraugus and State of New York, have invented certain new and useful Improvements in Nut-Locks; and I do hereby declare the following to be a full, clear, and exact description of the invention, such as will enable others skilled in the art to which it appertains to make and use the same.

This invention relates to an improvement in nut locks, and has for its object to provide simple and reliably efficient means for locking a nut against rotational movement upon a bolt.

Another object is to provide a nut lock including a locking pin or key so constructed and arranged as to be reliably locked against removal when operatively positioned with relation to the nut and bolt.

With these and other objects in view, the invention consists in the novel construction, arrangement and formation of parts as will be hereinafter specifically described, claimed and illustrated in the accompanying drawings, in which:

Figure 1 represents a side elevation of the improved nut lock applied to use, Fig. 2 represents an end elevation thereof, Fig. 3 represents a perspective view of the locking pin or key removed, and Fig. 4 represents an enlarged detail sectional view through the nut and bolt, illustrating the relative position of the parts when the nut is locked upon the bolt.

Referring to the drawing in detail, wherein similar reference numerals designate corresponding parts throughout the several views, the numeral 5 indicates the externally screw threaded shank of a bolt of the usual or any preferred construction having a head 6 at one end and a longitudinal groove or slot 7 extending inwardly from the opposite end a distance beyond the inner terminal of the external screw thread. The nut 8 is formed with the usual internally screw threaded bore 9 and is adapted to fit the shank of the bolt 5. An opening or bore 10 is formed obliquely, with relation to the bore 9, through the nut 8 and extends inwardly from one of the outer corners of the nut to the bore 9, terminating at approximately the longitudinal center of the latter. A tapered locking pin 13 is snugly and slidably fitted within the opening 10 and the inner end 14 thereof is beveled so as to lie flat upon the inner wall of the longitudinal groove or slot 7 in the shank of the bolt, before the locking pin or key is forcibly driven to operative position, as illustrated in Fig. 4. The outer extremity of the pin 13 is preferably formed with a head 15, whereby the pin may be conveniently removed, when desired.

In use, the nut 8 is advanced upon the threads of the shank 5 to the desired position and is subsequently adjusted so as to move the oblique opening 10 into registration with the longitudinal groove or slot 7. With the nut in this position the pin 13 is placed into the opening and the inner end 14 thereof engages within the longitudinal groove or slot 7 in the bolt, as illustrated in Fig. 1, thus reliably locking the nut against rotation upon the bolt. If desired, the pin 13 may be forcibly driven inwardly of the nut by striking blows, with a suitable tool, upon the head 15 thereof, thus turning or bending the inner beveled extremity 14 thereof, as illustrated in Fig. 4, and insuring against accidental loss or loosening of the lock pin. It is further evident that, incidental to the bending of the inner extremity of the pin, portions of the internal thread of the nut 8 are mutilated and thus the nut is more firmly held against rotational movement upon the bolt.

What I claim is:—

In a nut lock, an externally screw threaded bolt, a nut having an internally screw threaded bore and an opening intersecting said bore and extending obliquely with relation to the latter, said bolt having a longitudinal groove or slot adapted to be moved into registration with said oblique opening, and a locking pin slidably mounted within said oblique opening having a beveled end adapted when the pin is driven inwardly, to be bent laterally against the inner wall of said longitudinal groove or slot to secure the pin against removal.

In testimony whereof I affix my signature in presence of two witnesses.

ALBERT H. R. KUHN.

Witnesses:
 JAMES E. FANE,
 ETHEL E. JOHNSON.